United States Patent
Nagata et al.

(10) Patent No.: US 10,840,762 B2
(45) Date of Patent: Nov. 17, 2020

(54) BRUSHLESS MOTOR AND ELECTRIC BICYCLE PROVIDED WITH THE SAME

(71) Applicant: YAMAHA MOTOR ELECTRONICS CO., LTD., Shizuoka (JP)

(72) Inventors: Toshihiko Nagata, Shizuoka (JP); Yasufumi Takagi, Shizuoka (JP); Tomonari Shiraishi, Shizuoka (JP)

(73) Assignee: YAMAHA MOTOR ELECTRONICS CO., LTD., Shizuoka (JP)

( * ) Notice: Subject to any disclaimer, the term of this patent is extended or adjusted under 35 U.S.C. 154(b) by 563 days.

(21) Appl. No.: 15/551,319

(22) PCT Filed: Oct. 15, 2015

(86) PCT No.: PCT/JP2015/079190
§ 371 (c)(1),
(2) Date: Aug. 16, 2017

(87) PCT Pub. No.: WO2016/136017
PCT Pub. Date: Sep. 1, 2016

(65) Prior Publication Data
US 2018/0034338 A1 Feb. 1, 2018

(30) Foreign Application Priority Data
Feb. 27, 2015 (JP) ................. 2015-038558

(51) Int. Cl.
*H02K 3/487* (2006.01)
*B62M 6/40* (2010.01)
(Continued)

(52) U.S. Cl.
CPC ............. *H02K 3/487* (2013.01); *B62M 6/40* (2013.01); *B62M 1/36* (2013.01); *H02K 1/16* (2013.01);
(Continued)

(58) Field of Classification Search
None
See application file for complete search history.

(56) References Cited

U.S. PATENT DOCUMENTS 3,489,938 A 1/1970 Nakamura
7,550,891 B2* 6/2009 Kim .................... H02K 1/08
310/156.53

(Continued)

FOREIGN PATENT DOCUMENTS

EP  2 685 603 A1  1/2014
GB  2509738 A  7/2014
(Continued)

OTHER PUBLICATIONS

Official Communication issued in International Patent Application No. PCT/JP2015/079190, dated Jan. 19, 2016.

*Primary Examiner* — Nguyen Tran
(74) *Attorney, Agent, or Firm* — Keating and Bennett, LLP (57) ABSTRACT

A brushless motor includes a stator including teeth each including a constricted portion on which a coil is to be wound, and a tip end portion including a confronting surface that faces a rotor and having a width greater than that of the constricted portion. A spacer includes closure members disposed between adjacent ones of the tip end portions, and fitted to the teeth so that the confronting surfaces of the teeth are exposed toward the rotor.

11 Claims, 10 Drawing Sheets

(51) Int. Cl.
  *H02K 1/16* (2006.01)
  *H02K 5/128* (2006.01)
  *B62M 1/36* (2013.01)
  *H02K 1/27* (2006.01)

(52) U.S. Cl.
  CPC .............. *H02K 1/165* (2013.01); *H02K 1/27* (2013.01); *H02K 2005/1287* (2013.01); *Y02T 10/64* (2013.01)

(56) References Cited

U.S. PATENT DOCUMENTS

| | | |
|---|---|---|
| 2004/0124730 A1 | 7/2004 | Yamaguchi et al. |
| 2006/0108881 A1 | 5/2006 | Hauger et al. |
| 2006/0108890 A1* | 5/2006 | Hauger ................... H02K 1/16 310/214 |
| 2008/0061653 A1 | 3/2008 | Sagara et al. |
| 2009/0289520 A1 | 11/2009 | Takeshita et al. |
| 2011/0156525 A1 | 6/2011 | Takeshita et al. |
| 2012/0169154 A1* | 7/2012 | Curodeau ................ H02K 3/47 310/43 |
| 2014/0292118 A1* | 10/2014 | Takahashi ............... H02K 3/24 310/54 |
| 2015/0028716 A1 | 1/2015 | Zook et al. |

FOREIGN PATENT DOCUMENTS

| | | |
|---|---|---|
| JP | 53-016803 U1 | 2/1978 |
| JP | 2002-112473 A | 4/2002 |
| JP | 2003-047188 A | 2/2003 |
| JP | 2004-201446 A | 7/2004 |
| JP | 2006-191788 A | 7/2006 |
| JP | 2009-284641 A | 12/2009 |
| TW | 200822488 A | 5/2008 |

\* cited by examiner

BRUSHLESS MOTOR AND ELECTRIC BICYCLE PROVIDED WITH THE SAME

BACKGROUND OF THE INVENTION

1. Field of the Invention

The present invention relates to a brushless motor and an electric bicycle including the brushless motor.

2. Description of the Related Art

Brushless motors have been used to date, for example, as driving power sources for electric bicycles. A brushless motor includes, for example, a stator core having a plurality of teeth arranged radially, coils wound around the teeth, and a rotor rotatably disposed radially inward of the stator core.

When the rotor rotates within the stator core, acoustic noise may be produced by the air flowing between adjacent teeth. In addition, during rotation of the rotor, the magnetic force applied to the stator by the rotor magnet produces attractive and repulsive forces at the tip end portions of the teeth, which may, in some cases, cause the tip end portions of the teeth to vibrate. The vibrations of the teeth may also result in acoustic noise.

JP S53(1978)-16803 U discloses a tubular body of non-magnetic material disposed radially inward of the teeth of a stator core in order to reduce acoustic noise during rotation of a rotor.

In the brushless motor of JP S53(1978)-16803 U, the rotor is disposed radially inward of the teeth of the stator core. For this reason, in order to dispose the tubular body radially inward of the teeth of the stator core, it is necessary that either the outer diameter of the rotor should be reduced or the inner diameter of the stator core should be increased so that the tubular body can be provided with a sufficient installation space. However, when the outer diameter of the rotor is reduced, the capacity of the rotor is decreased, and when the inner diameter of the stator core is increased, the capacity of the stator is decreased. As a consequence, the performance of the brushless motor is deteriorated. Moreover, since the tubular body is interposed between the teeth and the rotor, the thickness of the tubular body results in a longer distance between the teeth and the rotor. As a consequence, the magnetic force between the rotor and the stator is weakened, which also deteriorates the performance of the brushless motor.

SUMMARY OF THE INVENTION

Preferred embodiments of the present invention provide brushless motors that significantly reduce or prevent acoustic noise during rotation of the rotor without impairing the expected performance, and electric bicycles including the brushless motors.

A brushless motor according to a preferred embodiment of the present invention includes a rotor that rotates about a center of rotation, and a stator. The stator includes a plurality of teeth arranged radially about the center of rotation and coils wound around the teeth, and the stator is disposed concentrically with the rotor. Each of the teeth includes a constricted portion on which each of the coils is wound, and a tip end portion that includes a confronting surface facing the rotor and has a width greater than that of the constricted portion. The tip end portions of adjacent ones of the teeth are spaced apart along a circumferential direction. The brushless motor further includes a spacer including a plurality of closure members disposed between adjacent ones of the tip end portions, and the spacer is fitted to the teeth so that the confronting surfaces of the teeth are exposed toward the rotor.

With this brushless motor, gaps between the tip end portions of adjacent ones of the teeth are closed by the closure members of the spacer. Therefore, during rotation of the rotor, airflow is prevented from passing through the gaps between the tip end portions of adjacent ones of the teeth, so that acoustic noise is significantly reduced or prevented. Moreover, during rotation of the rotor, the closure members of the spacer prevent the tip end portions of the teeth from vibrating. Accordingly, it is possible to significantly reduce or prevent acoustic noise resulting from vibrations of the tip end portions of the teeth. Furthermore, in this brushless motor, the confronting surfaces of the teeth are exposed toward the rotor. No portion of the spacer is disposed between the confronting surfaces of the teeth and the rotor, which means that it is unnecessary to reduce the size of the rotor or the stator in order to fit the spacer therein. As a result, the expected performance of the brushless motor is not impaired. Thus, this brushless motor makes it possible to significantly reduce or prevent acoustic noise during rotation of the rotor without impairing the expected performance of the motor.

In a preferred embodiment of the present invention, each of the closure members is preferably plate shaped and includes a first end portion and a second end portion. The spacer includes a first annular member having an annular shape about the center of rotation and that connects the first end portions of the closure members to each other, and a second annular member having an annular shape about the center of rotation and that connects the second end portions of the closure members to each other. The spacer includes openings, between adjacent ones of the closure members of the spacer, into which the tip end portions of the teeth are fitted.

The present preferred embodiment enables the spacer to have a higher strength because the closure members are connected by the first annular member and/or the second annular member. During rotation of the rotor, deformation and misalignment of the spacer are prevented, and therefore, acoustic noise is significantly reduced or prevented more reliably.

In another preferred embodiment of the present invention, the first annular member, the closure members, and the second annular member of the spacer are integrally made of a resin material.

With the present preferred embodiment, the first annular member, the closure members, and the second annular member are integrated, and therefore, the strength of the spacer is improved. Because the first annular member, the closure members, and the second annular member are made of a resin material, they may be integrally formed easily.

In another preferred embodiment of the present invention, the spacer includes ribs provided on sides of the closure members that face away from the rotor.

With the present preferred embodiment, the rib enables the closure member to have a higher strength. Accordingly, the strength of the entire spacer is improved. Because the ribs are provided on the sides of the closure members that face away from the rotor, it is not necessary to widen the gaps between the confronting surfaces of the teeth and the rotor, in order to arrange the ribs therein. As a result, the brushless motor is able to achieve its expected performance.

In another preferred embodiment of the present invention, each of the ribs is inclined so that the closer the rib is to the second end portion from the first end portion, the closer the rib is to the rotor, or inclined so that the closer the rib is to the first end portion from the second end portion, the closer the rib is to the rotor.

According to the present preferred embodiment, the spacer is able to be inserted into the teeth by placing the closure members between the tip end portions of the teeth and causing the space to slide along an axial direction of the closure members from either one of the first end portions or the second end portions. As a result, the spacer is fitted to the teeth easily. The ribs are utilized as members to help installation of the spacer.

In another preferred embodiment of the present invention, each of the tip end portions of the teeth includes a side surface facing the closure members of the spacer. Each of the closure members of the spacer is in contact with at least a portion of the side surface of each of the tip end portions of the teeth.

With the present preferred embodiment, each of the closure members of the spacer is in contact with at least a portion of the side surface of each of the tip end portions of the teeth, so that airflow is prevented satisfactorily from passing through the gaps between the closure members and the tip end portions of the teeth. Moreover, misalignment of the closure members is prevented during rotation of the rotor. As a result, it is possible to significantly reduce or prevent occurrence of acoustic noise more reliably.

In another preferred embodiment of the present invention, the closure members of the spacer are made of Liquid Crystal Polymer (LCP).

This preferred embodiment further reduces or prevents vibrations of the tip end portions of the teeth because the LCP has a vibration damping effect. As a result, it is possible to further reduce or prevent the occurrence of acoustic noise.

In another preferred embodiment of the present invention, each of the closure members of the spacer includes a main surface facing the rotor. The main surface of each of the closure members is radially flush with each of the confronting surfaces of the teeth.

With this preferred embodiment, because the main surfaces of the closure members of the spacer and the confronting surfaces of the teeth are flush with each other, there is no surface irregularity between each of the main surfaces of the closure members and each of the confronting surfaces of the teeth. Accordingly, it is possible to further reduce or prevent acoustic noise from being produced between the rotor and the teeth during rotation of the rotor.

In another preferred embodiment of the present invention, each of the closure members of the spacer includes a main surface facing the rotor. The main surface of each of the closure members is positioned closer to the rotor than the confronting surfaces of the teeth.

In this preferred embodiment, the main surfaces of the closure members of the spacer are positioned closer to the rotor than the confronting surfaces of the teeth, and the closure members are disposed even closer to the tip end portions of the teeth. As a result, it is possible to increase the number of windings of the coils, so that the output power of the motor is increased.

In another preferred embodiment of the present invention, each of the closure members of the spacer includes a main surface facing the rotor. The main surface of each of the closure members is positioned farther from the rotor than the confronting surfaces of the teeth.

With this preferred embodiment, the confronting surfaces of the teeth are positioned closer to the rotor than the main surfaces of the closure members, so that the gap between the teeth and the rotor is kept small. This makes it possible to increase the output power of the brushless motor.

In another preferred embodiment of the present invention, the stator preferably has an annular shape, and the rotor is disposed radially inward of the stator.

This preferred embodiment enables an inner rotor brushless motor to obtain the advantageous effects as described above.

In another preferred embodiment of the present invention, the rotor preferably has an annular shape, and the stator is disposed radially inward of the rotor.

This preferred embodiment enables an outer rotor brushless motor to obtain the advantageous effects as described above.

An electric bicycle according to a preferred embodiment of the present invention includes the brushless motor as described above, and a driving wheel driven by the brushless motor.

This enables the electric bicycle provided with the brushless motor to obtain the advantageous effects as described above.

Preferred embodiments of the present invention make it possible to provide brushless motors that significantly reduce or prevent acoustic noise during rotation of the rotor without impairing the expected performance of the brushless motor, and provide electric bicycles including such brushless motors.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
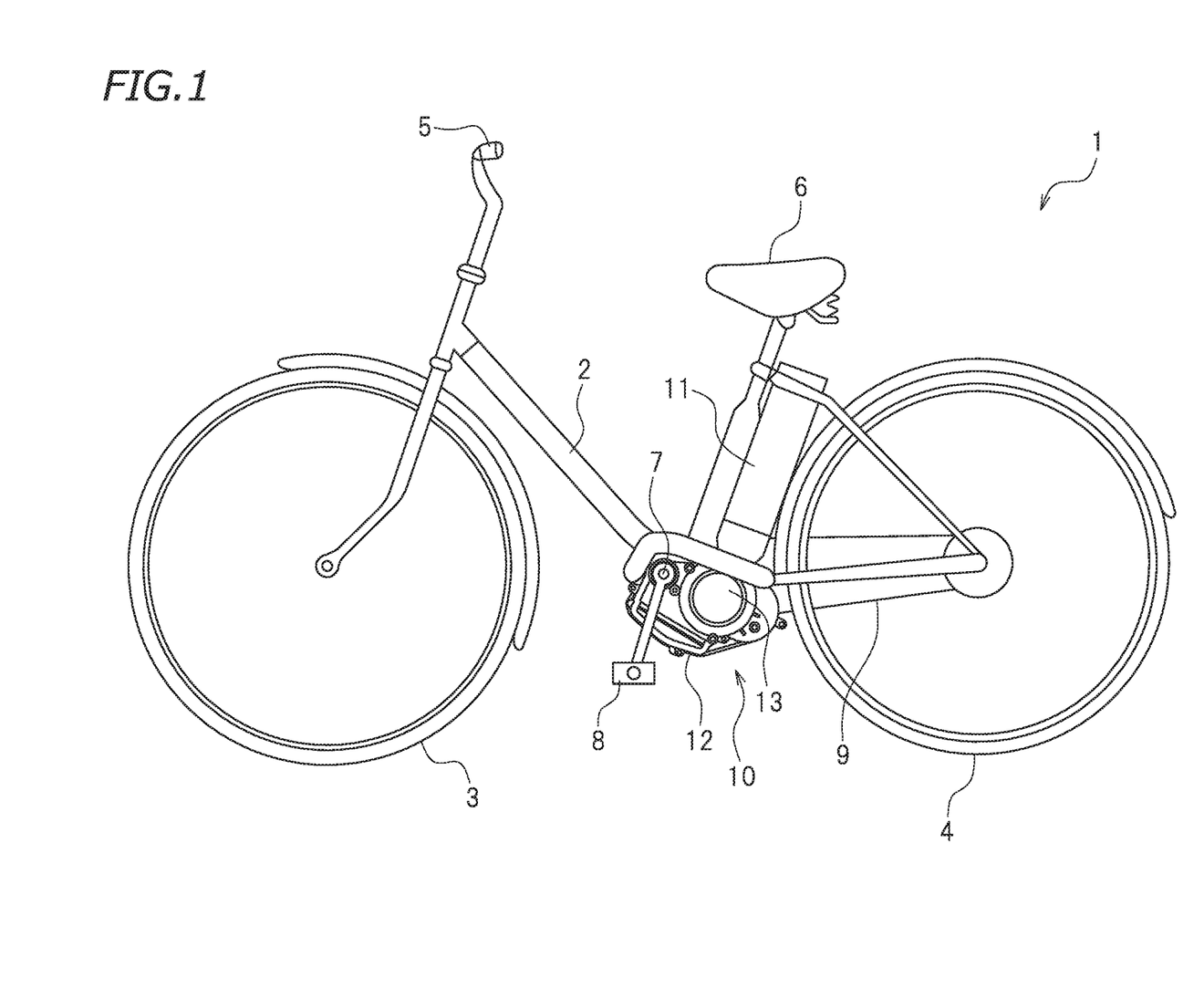
FIG. 1 is a side view illustrating an electric bicycle according to a preferred embodiment of the present invention.

As illustrated in FIG. 1, an electric bicycle 1 according to a preferred embodiment of the present invention includes a body frame 2; a front wheel 3 and a rear wheel 4, both of which are rotatably supported by the body frame 2; a handlebar 5 supported by the body frame 2 that steers the front wheel 3; a saddle 6 supported by the body frame 2 and on which the rider, not shown, sits; and a drive system 10 supported by the body frame 2. The rear wheel 4 is a driving wheel, which is driven by the drive system 10. The drive system 10 is provided with a crankshaft 7 that extends horizontally. Pedals 8 are connected to opposing ends of the crankshaft 7. The crankshaft 7 is rotated by the force of pressing on the pedals 8. The mechanical power from the crankshaft 7 is transmitted to the rear wheel 4 via a chain 9. The body frame 2 also supports a battery 11.

Figure 2:
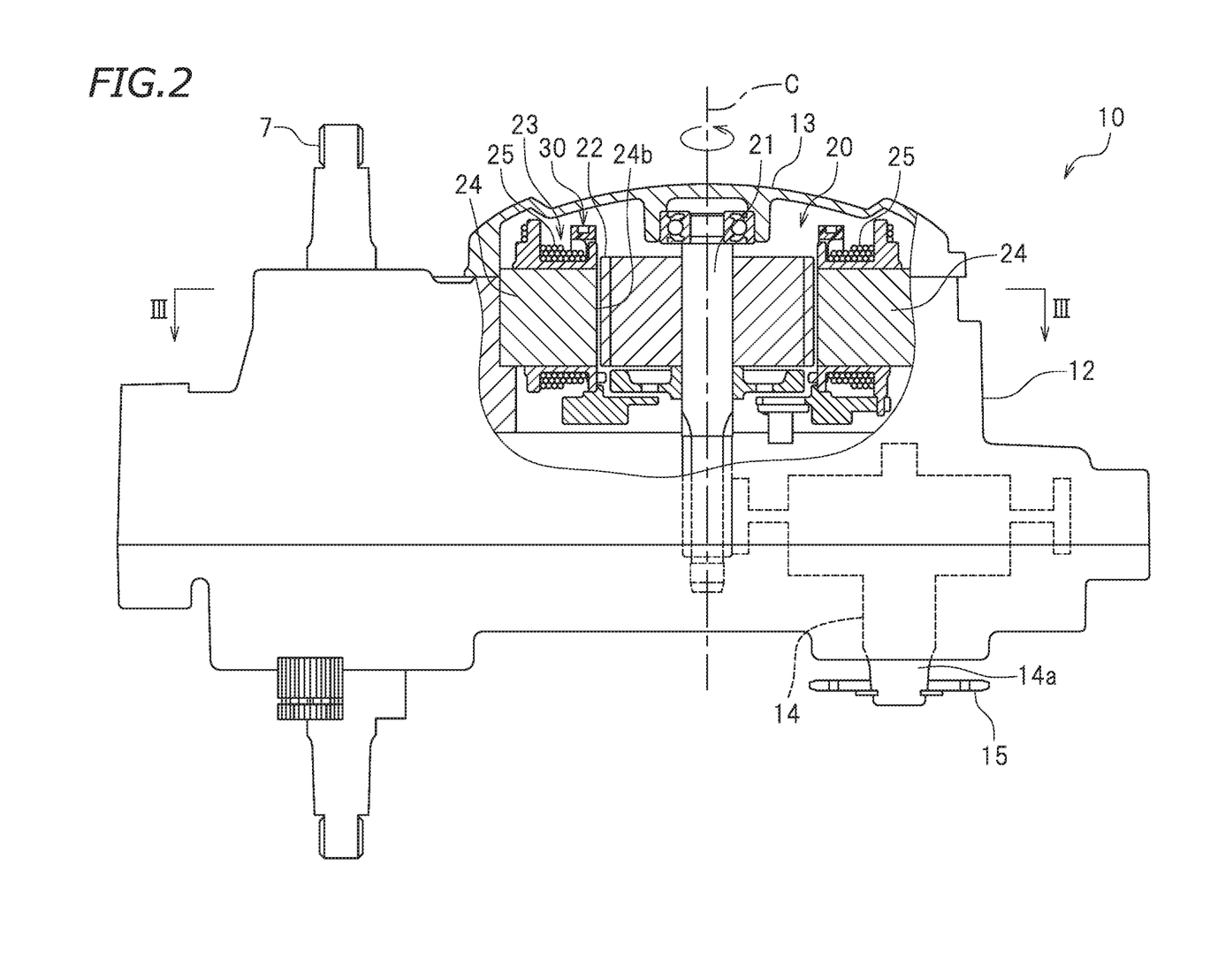
FIG. 2 is a plan view, partly in section, illustrating a drive system.

As illustrated in FIG. 2, the drive system 10 includes a housing 12, a cover 13 attached to the housing 12, a brushless motor (hereinafter simply referred to as "motor") 20 disposed inside the housing 12, and an output shaft 14 driven by the motor 20. An end portion 14*a* of the output shaft 14 is disposed outside the housing 12. Secured to the end portion 14*a* is a sprocket 15, around which the chain 9 (see FIG. 1) is provided.

The motor 20 is powered by the battery 11. The motor 20 generates auxiliary power according to the pedaling force applied to the pedals 8. The pedaling force applied to the pedals 8 and the mechanical power produced by the motor 20 are respectively transmitted via the crankshaft 7 and the output shaft 14 to the chain 9. The chain 9 combines the pedaling force and the mechanical power and transmits the combined force to the rear wheel 4. This enables the electric bicycle 1 to travel.

The motor 20 includes a rotary shaft 21, a rotor 22, a spacer 30, and a stator 23. The motor 20 according to the present preferred embodiment is a so-called inner rotor motor in which the rotor 22 is disposed radially inward of the stator 23 and has an annular shape. The rotor 22 is rotatable about the center of rotation C of the rotary shaft 21. Although the rotor 22 includes a permanent magnet in the present preferred embodiment, the configuration of the rotor 22 is not limited in any way. The rotary shaft 21 is secured to the rotor 22 so that it rotates together with the rotor 22. The output shaft 14 is coupled to the rotary shaft 21. The output shaft 14 rotates with the rotary shaft 21. The stator 23 is secured to the housing 12.

Figure 3:
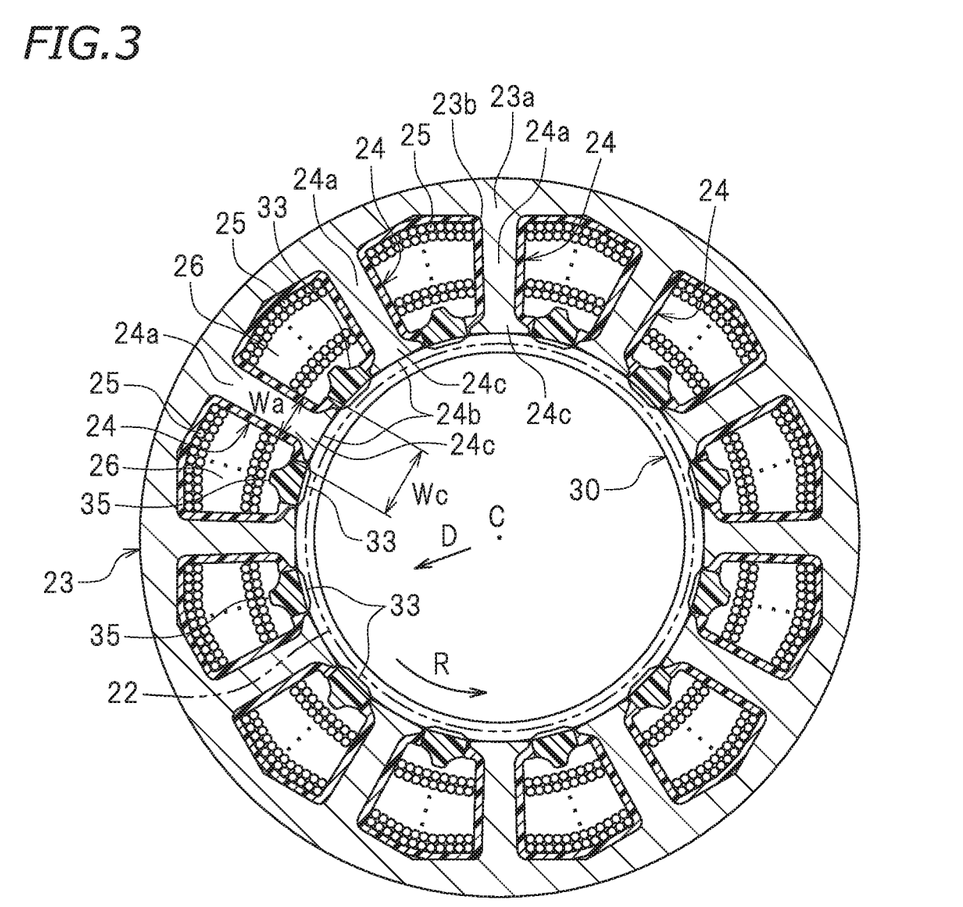
FIG. 3 is a cross-sectional view of a stator and a spacer of a motor according to the first preferred embodiment of the present invention, taken along line III-III of FIG. 2.

The stator 23 includes a plurality of teeth 24 and coils 25 wound around the teeth 24. FIG. 3 is a cross-sectional view of the stator 23 and the spacer 30, taken along line III-III. Note that FIG. 3 depicts only portions of the coils 25 and it does not show the rest of the portions of the coils 25. The stator 23 includes a core 23*a* and an insulator 23*b*. Each of the teeth 24 includes a portion of the core 23*a* and a portion of the insulator 23*b*.

The teeth 24 are arranged radially about the center of rotation C. Each of the teeth 24 includes a constricted portion 24*a* on which the coil 25 is to be wound, and a tip end portion 24*c* including a confronting surface 24*b* that faces the rotor 22. The constricted portion 24*a* and the tip end portion 24*c* are arranged such that the core 23*a* and the insulator 23*b* are disposed on sides of the core 23*a*, but the insulator 23*b* is not provided on the confronting surface 24*b* of the tip end portion 24*c*. The width We of the tip end portion 24*c* along a circumferential direction R is greater than the width Wa of the constricted portion 24*a* along the circumferential direction R. The tip end portions 24*c* of adjacent ones of the teeth 24 are spaced apart along the circumferential direction R. Slots 26 in which the coils 25 are accommodated are provided between adjacent ones of the teeth 24.

Figure 4:
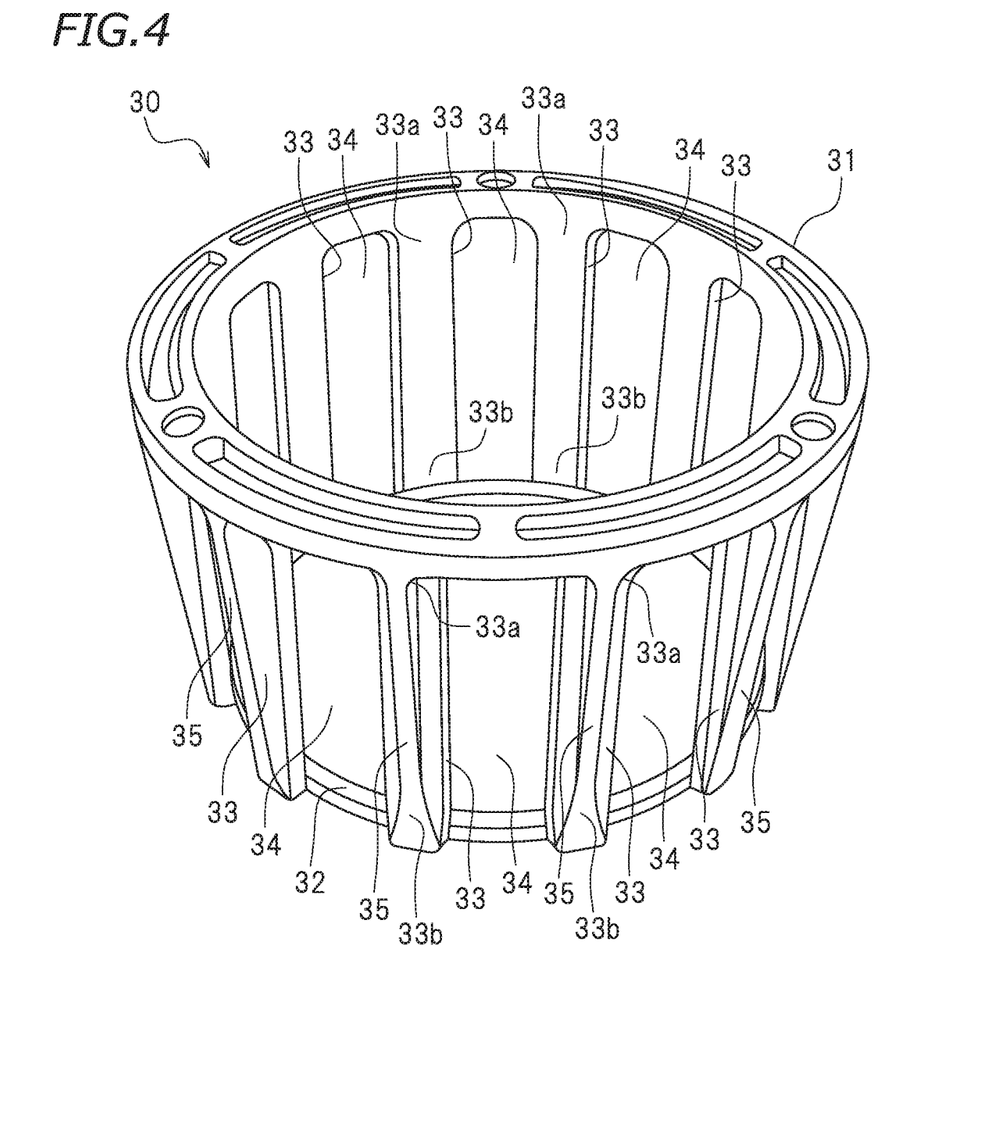
FIG. 4 is a perspective view of the spacer.
Figure 5:
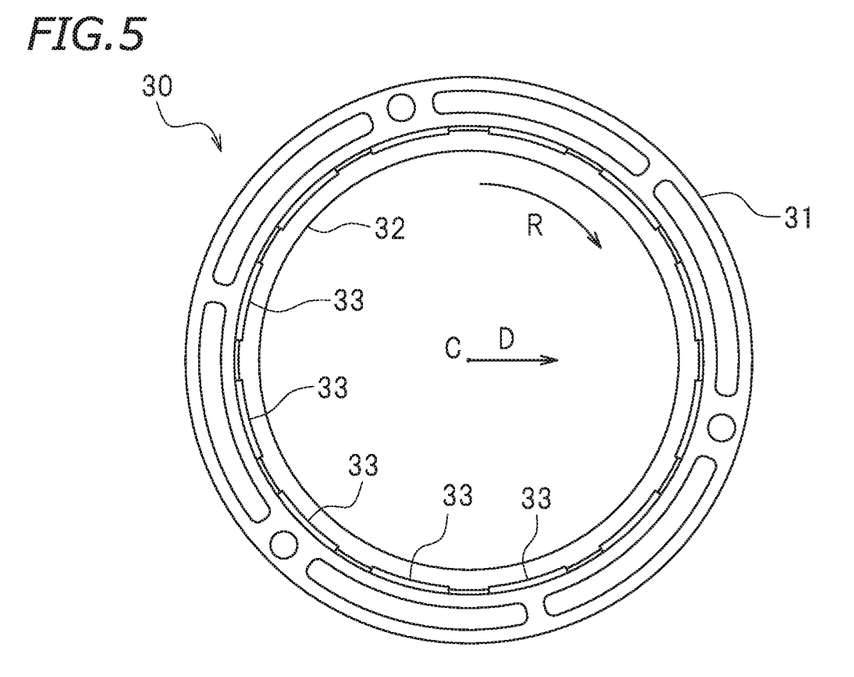
FIG. 5 is a plan view of the spacer.
Figure 6:
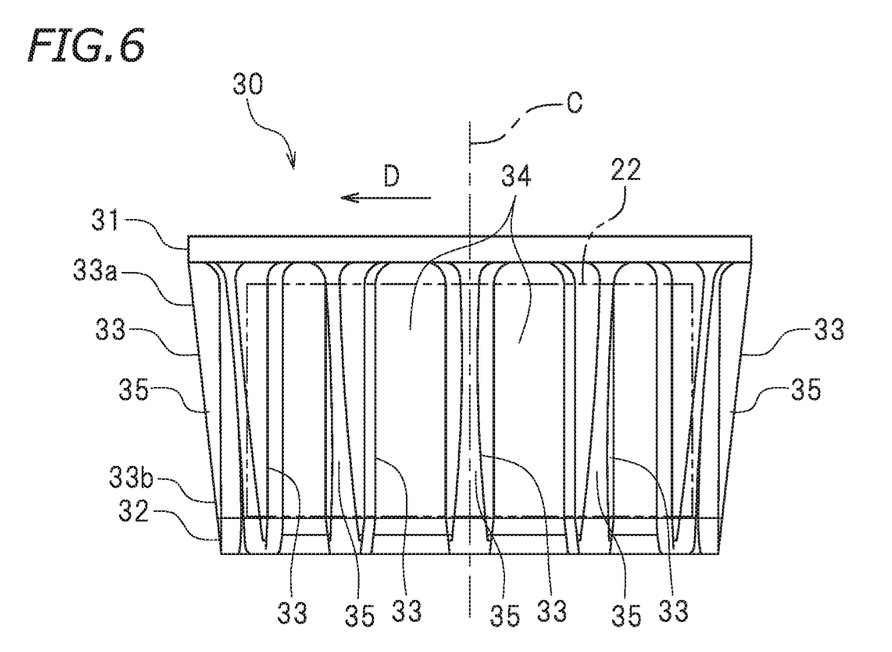
FIG. 6 is a side view of the spacer.
Figure 7:
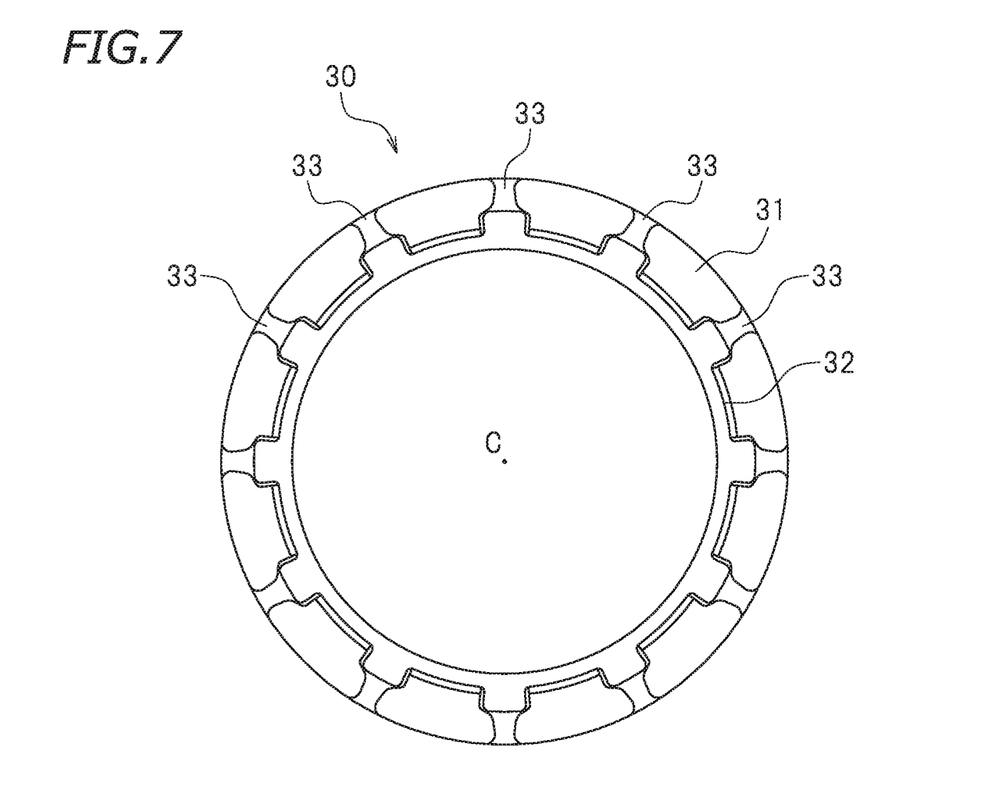
FIG. 7 is a reverse surface view of the spacer.

FIG. 4 is a perspective view of the spacer 30. FIGS. 5, 6, and 7 are respectively a plan view, a side view, and a reverse surface view of the spacer 30. As illustrated in FIGS. 4 to 7, the spacer 30 includes a first annular member 31, a second annular member 32, and a plurality of closure members 33. Each of the closure members 33 preferably has a plate shape. Each of the closure members 33 includes a first end portion 33*a* and a second end portion 33*b* on opposing ends of the rotary shaft 21 along its axis. The first annular member 31 and the second annular member 32 preferably have an annular shape about the center of rotation C. The first annular member 31 connects the first end portions 33*a* of the closure members 33 to each other. The second annular member 32 connects the second end portions 33*b* of the closure members 33 to each other. Openings 34 are provided between adjacent ones of the closure members 33. The openings 34 are through-holes defined by the first annular member 31, the second annular member 32, and the closure members 33.

As illustrated in FIG. 6, ribs 35 are provided on outer side portions of the closure members 33 each of which faces in a radial direction D. The ribs 35 protrude outward in the radial directions D. As illustrated in FIG. 3, the rotor 22 is disposed inward of the closure members 33 in a radial direction D. The ribs 35 are provided on surfaces of the closure members 33 that face away from the rotor 22. As illustrated in FIG. 6, each of the ribs 35 is inclined so that the closer the rib 35 is to the second end portion 33*b* from the first end portion 33*a* of the closure member 33, the farther inward the rib 35 is located along the radial direction D. Each of the ribs 35 is inclined so that the closer the rib 35 is to the second end portion 33*b* from the first end portion 33*a* of the closure member 33, the closer the rib 35 is to the rotor 22. The outer diameter of the first annular member 31 is greater than the outer diameter of the second annular member 32.

The first annular member 31, the closure members 33, and the second annular member 32 are integrally made of a resin material, for example. The spacer 30 is integrally made of a resin material, for example. Examples of the resin material include PBT and PPS. The present preferred embodiment preferably uses, for example, as the resin material, a LCP (Liquid Crystal Polymer), which has a vibration damping effect. The resin material is, however, not specifically limited thereto. The first annular member 31, the closure members 33, and the second annular member 32 may be made of a material other than the resin material. It is possible to use any suitable nonmagnetic material, for example.

In the present preferred embodiment, the spacer 30 is engaged with the stator 23, as illustrated in FIG. 3. The spacer 30 is fitted to the stator 23 so that the closure members 33 are fitted into the gaps between the tip end portions 24*c* of the teeth 24. The tip end portions 24*c* of the teeth 24 are fitted into the openings 34 (see FIG. 4) of the spacer 30. Thus, the confronting surfaces 24*b* of the teeth 24 are exposed toward the rotor 22. As illustrated in FIG. 2, the spacer 30 is not interposed between the rotor 22 and the confronting surfaces 24*b* of the teeth 24. The confronting surfaces 24*b* of the teeth 24 and the rotor 22 directly face each other, without any other member interposed therebetween.

Figure 8:
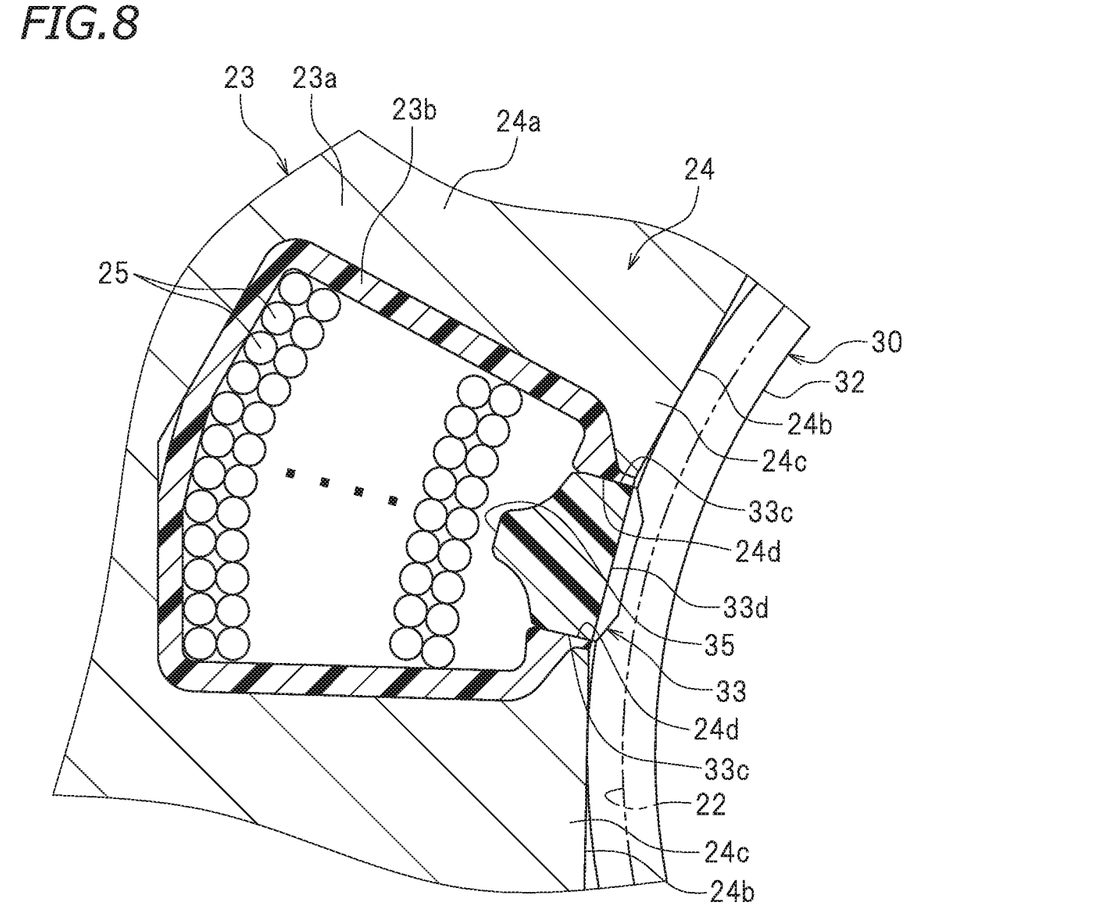
FIG. 8 is a partially enlarged cross-sectional view of the stator and the spacer.

As illustrated in FIG. 8, each of the tip end portions 24*c* of the teeth 24 includes a side surface 24*d* facing the closure member 33. The closure member 33 is in contact with at least a portion of the side surface 24*d*. No gap that allows the air to pass through exists between the tip end portion 24*c* of each of the teeth 24 and the closure member 33. In the present preferred embodiment, each of the tip end portions 24c of the teeth 24 includes a side surface 24d facing a side surface 33c of the closure member 33. The side surface 24d and the side surface 33c are preferably flat surfaces. This means that the closure member 33 is in surface contact with at least a portion of the side surface 24d. In the present preferred embodiment, the closure member 33 is in surface contact with the entire side surface 24d. Note that the closure member 33 is not in contact with the constricted portion 24a of the teeth 24. The ribs 35 are disposed radially outward relative to the tip end portions 24c of the teeth 24.

Each of the closure members 33 includes a main surface 33d facing the rotor 22. The main surfaces 33d of the closure members 33 are arranged along a circumferential direction R so as to be flush with the confronting surfaces 24b of the teeth 24. Herein, the phrase "arranged along a circumferential direction R so as to be flush with the confronting surfaces 24b" means that no or substantially no surface level difference exists radially between the main surfaces 33d of the closure members 33 and the confronting surfaces 24b of the teeth 24. In the present preferred embodiment, the confronting surfaces 24b of the teeth 24 and the main surfaces 33d of the closure members 33 are preferably flat surfaces. However, it is also possible that the confronting surfaces 24b of the teeth 24 and/or the main surfaces 33d of the closure members 33 may be curved surfaces.

As described previously, the ribs 35 of the spacer 30 are inclined so that the closer the ribs 35 are to the second end portions 33b from the first end portions 33a of the closure members 33, the farther inward the ribs 35 are located along the radial directions D. This allows the spacer 30 to slide against the stator 23 by locating the second end portions 33b of the closure members 33 in the gaps between the tip end portions 24c of the teeth 24 and pressing the spacer 30 toward the stator 23 in an axial direction. As a result, the spacer 30 is able to be press-fitted into the stator 23, so that the spacer 30 is fitted to the stator 23 easily.

The configuration of the motor 20 has been described above. When electric power is supplied to the motor 20, the rotor 22 rotates within the stator 23. At this point, airflow occurs between the rotor 22 and the stator 23. However, the closure members 33 of the spacer 30 are disposed between the tip end portions 24c of adjacent ones of the teeth 24. As a result, no airflow passes through the gaps between adjacent ones of the teeth 24.

Thus, in the motor 20 according to the present preferred embodiment, the gaps between the tip end portions 24c of adjacent ones of the teeth 24 are closed by the closure members 33 of the spacer 30. During rotation of the rotor 22, airflow is prevented from passing through the gaps between the tip end portions 24c of adjacent ones of the teeth 24. Therefore, acoustic noise is significantly reduced or prevented.

In addition, during rotation of the rotor 22, the magnetic force between the rotor 22 and the stator 23 causes attractive and repulsive forces in the teeth 24. As a consequence, a force is applied to the teeth 24 periodically. However, in the motor 20 according to the present preferred embodiment, the closure members 33 of the spacer 30 are disposed between the tip end portions 24c of adjacent ones of the teeth 24. The closure members 33 prevent the tip end portions 24c of the teeth 24 from vibrating. As a result, the motor 20 significantly reduces or prevents acoustic noise.

Moreover, the motor 20 according to the present preferred embodiment exposes the confronting surfaces 24b of the teeth 24 toward the rotor 22, although the spacer 30 is disposed in the motor 20. A portion of the spacer 30 is not disposed between the confronting surfaces 24b of the teeth 24 and the rotor 22, which means that, in order to position the spacer 30, it is unnecessary to reduce the outer diameter of the rotor 22 or increase the inner diameter of the stator 23. Thus, because the sizes of the rotor 22 and the stator 23 need not be reduced, the expected performance of the motor 20 is not impaired.

Accordingly, the motor 20 according to the present preferred embodiment makes it possible to significantly reduce or prevent acoustic noise during rotation of the rotor 22 without impairing the expected performance of the motor 20.

It may appear possible to reliably obtain the expected performance of the motor 20 by increasing the inner diameter of the stator 23 and also increasing the outer diameter of the stator 23 so as to maintain the size of the stator 23. In that case, however, because the outer diameter of the stator 23 increases, the overall outer diameter of the motor 20 increases accordingly, which causes the overall size of the drive system 10 to increase. However, with the motor 20 according to the present preferred embodiment, there is no increase in the size of the motor 20.

In the motor 20 according to the present preferred embodiment, the closure members 33 are connected by the first annular member 31 and the second annular member 32. This improves the strength of the spacer 30. During rotation of the rotor 22, deformation and misalignment of the spacer 30 are prevented, and therefore, acoustic noise is further reduced or prevented.

In the motor 20 according to the present preferred embodiment, the first annular member 31, the closure members 33, and the second annular member 32 of the spacer 30 are preferably integral with each other, i.e., integrally formed. Therefore, the strength of the spacer 30 is improved. Especially, the present preferred embodiment makes it easy to integrally form the first annular member 31, the closure members 33, and the second annular member 32 because the first annular member 31, the closure members 33, and the second annular member 32 are preferably formed of a resin material.

In the motor 20 according to the present preferred embodiment, the spacer 30 includes ribs 35 provided on sides of the closure members 33 that face away from the rotor 22. These ribs 35 increase the strength of the closure members 33, resulting in improvements in the strength of the entire spacer 30. Because the ribs 35 are provided on sides of the closure members 33 that face away from the rotor 22, it is not necessary to widen the gaps between the confronting surfaces 24b of the teeth 24 and the rotor 22. As a result, the motor 20 is able to achieve its expected performance.

Each of the ribs 35 is inclined so that the closer the rib 35 is to the second end portion 33b from the first end portion 33a of the closure member 33, the closer the rib 35 is to the rotor 22. As described previously, by arranging the closure members 33 in the gaps between the tip end portions 24c of the teeth 24 and causing the spacer 30 to slide from the second end portions 33b along the axis of the closure members 33, the spacer 30 is inserted into the teeth 24. As a result, the spacer 30 is fitted to the teeth 24 easily. In addition, the ribs 35 may be utilized as members to help installation of the spacer 30. It should be noted that, although the rib 35 is inclined so that the closer the rib 35 is to the second end portion 33b from the first end portion 33a of the closure member 33, the closer the rib 35 is to the rotor 22 in the present preferred embodiment, it is also possible that the rib 35 may be inclined so that the closer the rib 35 is to the first end portion 33a from the second end portion 33b of the closure member 33, the closer the rib 35 is to the rotor 22.

In the motor 20 according to the present preferred embodiment, each of the closure members 33 of the spacer 30 is in contact with at least a portion of each of the side surfaces 24d of the tip end portions 24c of the teeth 24. Therefore, airflow is satisfactorily prevented from passing through the gaps between the closure members 33 and the tip end portions 24c of the teeth 24. Moreover, misalignment of the closure members 33 is prevented during rotation of the rotor 22. As a result, it is possible to prevent occurrence of acoustic noise more reliably.

During rotation of the rotor 22, airflow is produced around the rotor 22, and the airflow passes along the main surfaces 33d of the closure members 33 and the confronting surfaces 24b of the teeth 24 alternately in the circumferential direction R. In the motor 20 according to the present preferred embodiment, the main surfaces 33d of the closure members 33 and the confronting surfaces 24b of the teeth 24 are arranged along the circumferential direction R so as to be flush with each other. There is no or substantially no surface irregularity between each of the main surfaces 33d of the closure members 33 and each of the confronting surfaces 24b of the teeth 24. Therefore, it is unlikely that acoustic noise is produced when the airflow passes through the main surfaces 33d of the closure members 33 and the confronting surfaces 24b of the teeth 24 alternately. Accordingly, the motor 20 according to the present preferred embodiment makes it possible to further reduce or prevent acoustic noise.

Modified Preferred Embodiments

Figure 9:
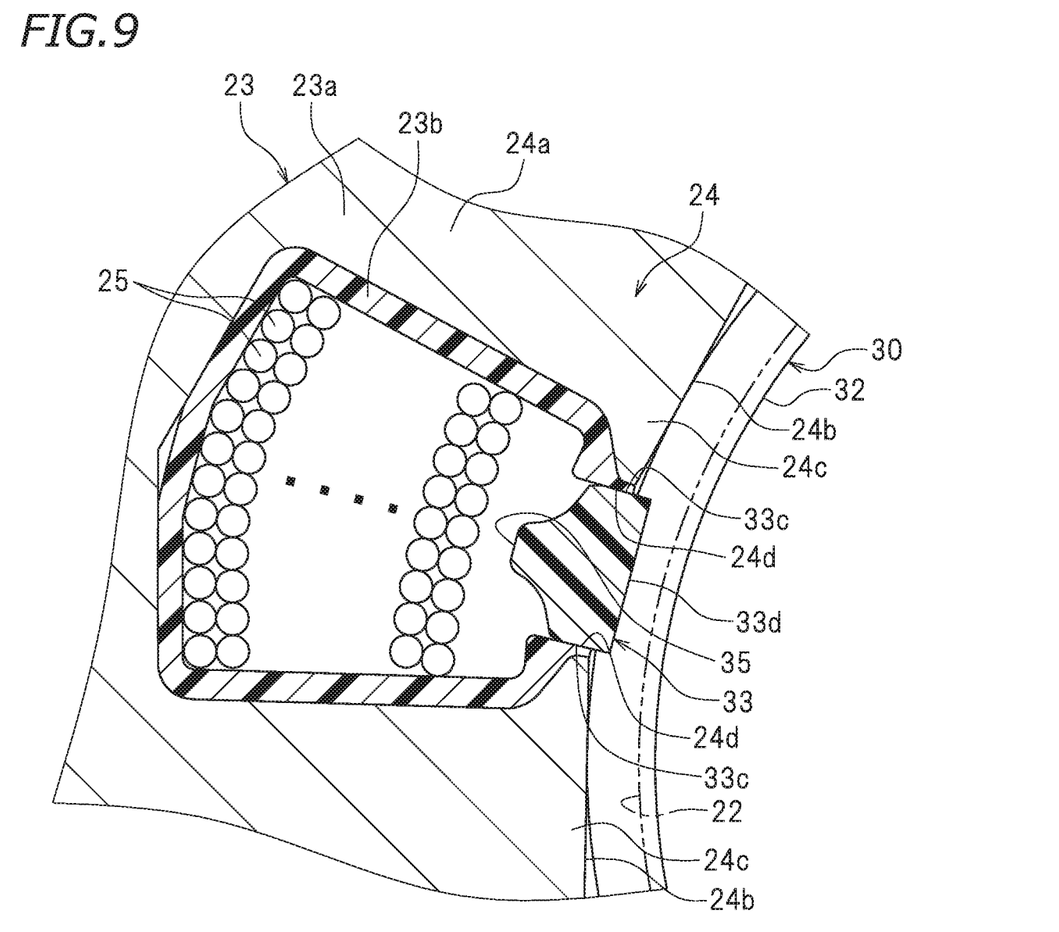
FIG. 9 is a partially enlarged cross-sectional view of a stator and a spacer according to a modified preferred embodiment of the present invention.

In the first preferred embodiment, the main surfaces 33d of the closure members 33 of the spacer 30 and the confronting surfaces 24b of the teeth 24 are preferably flush or substantially flush with each other along the circumferential direction R. However, it is also possible that, as illustrated in FIG. 9, the main surfaces 33d of the spacer 30 may be positioned closer to the rotor 22 than the confronting surfaces 24b of the teeth 24. This allows the closure members 33 to be disposed closer to the tip end portions 24c of the teeth 24. As a result, the number of windings of the coils 25 is able to be increased, so that the output power of the motor 20 is able to be increased.

Figure 10:
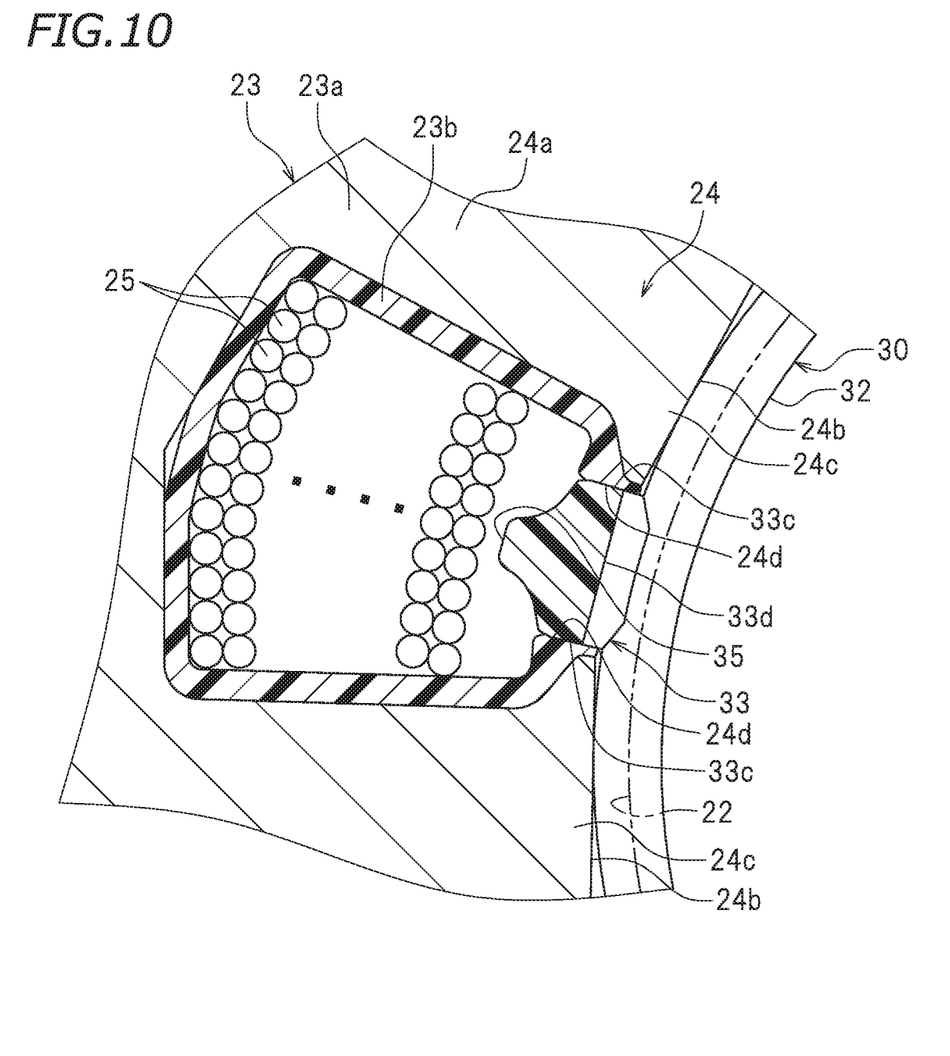
FIG. 10 is a partially enlarged cross-sectional view of a stator and a spacer according to another modified preferred embodiment of the present invention.

It is also possible that, as illustrated in FIG. 10, the main surfaces 33d of the spacer 30 are positioned farther from the rotor 22 than the confronting surfaces 24b of the teeth 24. Taking manufacturing tolerances into consideration, some gap space is preferably provided between the main surfaces 33d of the spacer 30 and the rotor 22. With the structure shown in FIG. 10, the confronting surfaces 24b of the teeth 24 are positioned closer to the rotor 22 than the main surfaces 33d of the closure members 33, so that the gap between the teeth 24 and the rotor 22 is able to be kept small. This makes it possible to increase the output power of the motor 20.

In the foregoing preferred embodiments, the spacer 30 is preferably an integral one piece member. However, it is also possible that the spacer 30 may include two or more members. For example, each of the closure members 33 may include a first portion connected to the first annular member 31 and a second portion connected to the second annular member 32. The first annular member 31 and the first portions of the closure members 33 may define a first member, and the second annular member 32 and the second portions of the closure members 33 may define a second member. In other words, each of the closure members 33 may include the first member and the second member that are separable in an axial direction. In this case, the first portions of the closure members 33 may be inclined so that the more distant they are from the first annular member 31, the closer they are to the rotor 22, and the second portions of the closure members 33 may be inclined so that the more distant they are from the second annular member 32, the closer they are to the rotor 22. As a result, the first member is easily fitted into the stator 23 toward the second member, and the second member is easily fitted into the stator 23 toward the first member.

Second Preferred Embodiment

Figure 11:
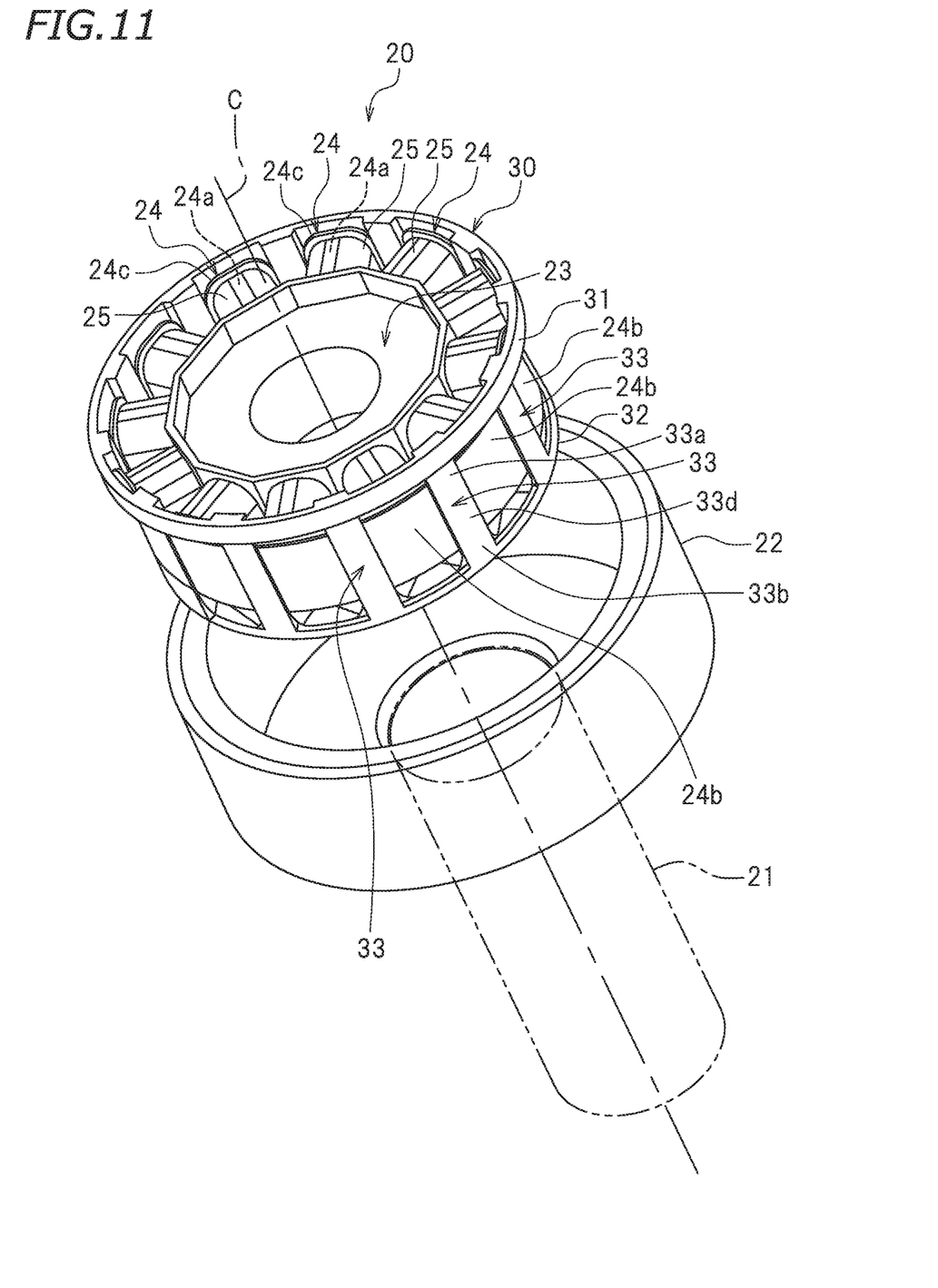
FIG. 11 is a perspective view illustrating main elements of a motor according to a second preferred embodiment of the present invention.

The motor 20 according to the first preferred embodiment of the present invention is preferably an inner rotor motor, but it is also possible to apply preferred embodiments of the present invention to an outer rotor motor, in which a stator is disposed radially inward of an annular-shaped rotor. A motor 20 according to a second preferred embodiment of the present invention, shown in FIG. 11, is an outer rotor motor. In the following description, the same elements as those in the first preferred embodiment are designated by the same reference signs, and a further description thereof will be omitted.

The motor 20 according to the present preferred embodiment also includes a rotor 22 that is rotatable about a center of rotation C, a stator 23 disposed concentrically with the rotor 22, and a spacer 30. The stator 23 and the spacer 30 are disposed inward of the rotor 22. The stator 23 includes a plurality of teeth 24 disposed radially about the center of rotation C, and coils 25 wound around the teeth 24. Note that in FIG. 11, the coils 25 are shown schematically.

Although the first preferred embodiment includes teeth 24 that extend radially inward, the second preferred embodiment includes teeth 24 extending radially outward. Each of the teeth 24 includes a constricted portion 24a on which the coil 25 is to be wound, and a tip end portion 24c including a confronting surface 24b that faces the rotor 22 and having a width greater than that of the constricted portion 24a. The tip end portions 24c of adjacent ones of the teeth 24 are spaced apart along a circumferential direction R.

The spacer 30 includes a plurality of closure members 33 disposed between the tip end portions 24c of adjacent ones of the teeth 24, and is fitted to the teeth 24 so that the confronting surfaces 24b of the teeth 24 are exposed toward the rotor 22. First end portions 33a of the closure members 33 are connected to each other by a first annular member 31, and second end portions 33b thereof are connected to each other by a second annular member 32.

In other respects, the second preferred embodiment is preferably the same as the first preferred embodiment, and therefore a further description thereof will be omitted. Note that the same modified example as that in the first preferred embodiment is also possible in the second preferred embodiment.

The motor 20 according to the second preferred embodiment offers the same advantageous effects as does the motor 20 according to the first preferred embodiment.

The terms and expressions which have been used herein are used as terms of description and not of limitation. There is no intention in the use of such terms and expressions of to exclude any equivalents of any of the features shown or described, or portions thereof, and it is recognized that various modifications are possible within the scope of the invention claimed. The present invention may be embodied in many different forms. This disclosure should be considered as providing exemplary preferred embodiments of the principles of the present invention. The preferred embodiments are described herein with the understanding that such preferred embodiments are not intended to limit the present invention to any specific preferred embodiments described and/or illustrated herein. The present invention is not limited to specific preferred embodiments described herein. The present invention encompasses all the preferred embodiments including equivalents, alterations, omissions, combinations, improvements, and/or modifications that can be recognized by those skilled in the arts based on this disclosure. Limitations in the claims should be interpreted broadly based on the language used in the claims, and such limitations should not be limited to specific preferred embodiments described in the present description or provided during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A brushless motor comprising:
a rotor that rotates about a center of rotation; and
a stator including a plurality of teeth arranged radially about the center of rotation and coils wound around the teeth, the stator disposed concentrically with the rotor;
wherein each of the plurality of teeth includes a constricted portion on which each of the coils is wound, and a tip end portion including a confronting surface facing the rotor, the tip end portion having a width greater than a width of the constricted portion;
the tip end portions of adjacent ones of the teeth are spaced apart along a circumferential direction of the stator;
the brushless motor further includes a spacer including a plurality of closure members disposed between adjacent ones of the tip end portions, and the spacer is fitted to the teeth so that the confronting surfaces of the teeth are exposed toward the rotor;
each of the plurality of closure members is plate shaped and includes a first end portion and a second end portion;
the spacer includes a first annular member having an annular shape about the center of rotation and that connects the first end portions of the plurality of closure members to each other, and a second annular member having an annular shape about the center of rotation and that connects the second end portions of the plurality of closure members to each other;
the spacer includes openings in which the tip end portions of the teeth are fitted, and the openings are located between adjacent ones of the plurality of closure members of the spacer; and
the spacer includes ribs located on sides of the plurality of closure members that face away from the rotor.

2. The brushless motor according to claim 1, wherein the first annular member, the plurality of closure members, and the second annular member of the spacer are integral and made of a resin material.

3. The brushless motor according to claim 1, wherein each of the ribs is inclined so that the closer the rib is to the second end portion from the first end portion the closer the rib is to the rotor, or inclined so that the closer the rib is to the first end portion from the second end portion the closer the rib is to the rotor.

4. The brushless motor according to claim 1, wherein
each of the tip end portions of the teeth includes a side surface facing the plurality of closure members of the spacer; and
each of the plurality of closure members of the spacer is in contact with at least a portion of the side surface of each of the tip end portions of the teeth.

5. The brushless motor according to claim 1, wherein the plurality of closure members of the spacer are made of a liquid crystal polymer.

6. The brushless motor according to claim 1, wherein
each of the plurality of closure members of the spacer includes a main surface facing the rotor; and
the main surface of each of the plurality of closure members is radially flush with each of the confronting surfaces of the teeth.

7. The brushless motor according to claim 1, wherein
each of the plurality of closure members of the spacer includes a main surface facing the rotor; and
the main surface of each of the plurality of closure members is located closer to the rotor than the confronting surfaces of the teeth.

8. The brushless motor according to claim 1, wherein
each of the plurality of closure members of the spacer includes a main surface facing the rotor; and
the main surface of each of the plurality of closure members is located farther from the rotor than the confronting surfaces of the teeth.

9. The brushless motor according to claim 1, wherein
the stator has an annular shape; and
the rotor is disposed radially inward of the stator.

10. The brushless motor according to claim 1, wherein
the rotor has an annular shape; and
the stator is disposed radially inward of the rotor.

11. An electric bicycle comprising:
the brushless motor according to claim 1; and
a driving wheel driven by the brushless motor.

* * * * *